June 23, 1964 R. E. FITZ GERALD 3,138,420
SEAL SPRING SOCKET ASSEMBLY
Filed Oct. 8, 1962

Inventor:
Robert E. Fitz Gerald,
by Gordon Needleman
Atty.

United States Patent Office 3,138,420
Patented June 23, 1964

3,138,420
SEAL SPRING SOCKET ASSEMBLY
Robert E. Fitz Gerald, Quincy, Mass., assignor to United-Carr Incorporated, Cambridge, Mass., a corporation of Delaware
Filed Oct. 8, 1962, Ser. No. 229,056
1 Claim. (Cl. 339—61)

This invention relates generally to seal springs and more particularly to an improved seal spring for use in lamp sockets.

A primary object of the invention is to provide a seal for waterproofing and dustproofing an electric lamp receptacle, the seal providing a spring means for engagement with the lamp socket.

A still further object of the invention is to provide a spring seal having means of providing movable relationship between the wire leads and the shell of the receptacle.

A still further object of the invention is to provide an electric socket having seal spring means engaged therewith.

Other objects of the invention will, in part, be obvious, and will, in part, appear hereinafter.

Figure 1:
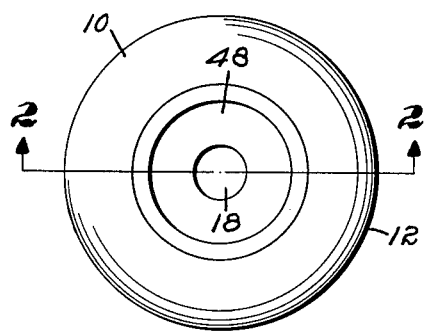
FIG. 1 is a plan view of the seal means.
Figure 2:
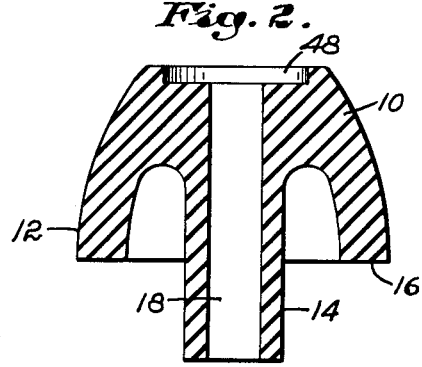
FIG. 2 is a section taken on line 2—2 of FIG. 1.
Figure 3:
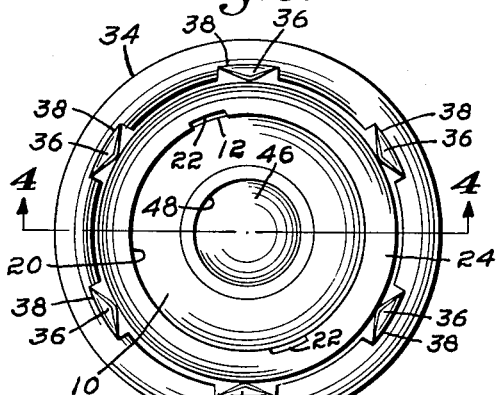
FIG. 3 is a top plan view of the seal means engaged within a receptacle.

Referring to the drawings and particularly FIGS. 1 and 2, there is shown a spring seal means formed of a resilient material such as rubber and having the general lateral configuration of a truncated cone. The spring seal means comprises a base portion 10 whose external surface is in the form of a truncated cone, a flange 12 extends from the periphery of the base portion and a stem 14 extends from the median portion of the base part 10 toward the same plane as that toward which the flange 12 is directed and the stem 14 is in spaced relationship with the flange 12. The flange 12 circumscribes a portion of the stem 14. The stem 14 is extended in length beyond the lowest surface of the flange 12, which flange surface will be referred to as a terminal edge 16. A wire receiving passage 18 extends longitudinally through the base part 10 and the stem 14.

Numerous efforts have been made in the past to obtain a seal at the base of a lamp socket which would prevent the passage of dust or water into the interior of the socket itself. Efforts were also made, at the same time, to incorporate some type of a spring action with the seal means in order to reduce the number of parts being utilized in the assembly. A seal with a metal spring member has been utilized to accomplish the desired result. Later in the history of this development a solid piece usually formed of some compressible material was utilized; however, the constructions in these cases were dissimilar to the illustrated embodiment. A careful search of the prior art has not disclosed the utilization of a stem member which is movable in relation to the aperture formed at the base of the receptacle. Nor is there any indication of the use of a flange in spaced circumscribed relation to the stem element. The older devices usually failed in one of two ways: their construction was not efficient enough to allow the necessary spring action and they did not provide the stem type arrangement for closely engaging the contact wire.

The socket member to be engaged with the spring seal comprises a substantially cylindrical or tubular body portion 20 open at both ends, one of which ends an acceptance end 24, is designed to accept a lamp of the usual type. Cutout or pressed out key ways or J-slots 22 may be provided in the walls of the tubular body portion 20 to engage the usual pins or projections of a lamp base. At the open end 19, opposite from the acceptance end 24 of the tubular body portion 20, a flange base portion 26 extends inwardly therefrom substantially at right angles thereto to narrow or constrict the opening. The terminal edge of the base portion 26 may be bent back upon itself to form an annular inner wall 28 defining the opening 19. Numerous methods could be utilized for engaging the socket to an apertured support. The applicant has utilized a "plug button form" comprising a base area 30 having a central aperture 32 formed therein and the said base area 30 is bent back upon itself to form an annular rim 34.

At the terminal edge of the base area 30, which is bent back on itself, a group of resilient segments 36 is formed extending in angular relationship to the base area 30 and which are each bent to form a knuckle 38. The opposite terminal edge of the base area 30 is provided with an upstanding peripheral wall 40 extending in the opposite direction from that of the resilient segments 36. The inner diameter of the peripheral wall 40 is approximately equal to the outside diameter of the tubular body portion 20 of the socket and an engagement is made between the two parts so that the base area 30, the annular rim 34, the resilient segments 36, and the peripheral wall 40 circumscribe the tubular body portion 20 with the peripheral wall 40 in abutting relationship to the tubular body portion 20. At this juncture the resilient segments 36 are directed at substantially the same plane as that toward which the acceptance end 24 is faced. To assist in the engagement with a bulb 42, the wall of the acceptance end 24 may be flared away from the axis of the socket.

To engage the spring seal with the socket proper the spring seal is dropped into the tubular body portion 20. To facilitate this operation the greatest external diameter of the flange 12 is equal to or slightly less than the internal diameter of the tubular body portion 20.

Figure 4:
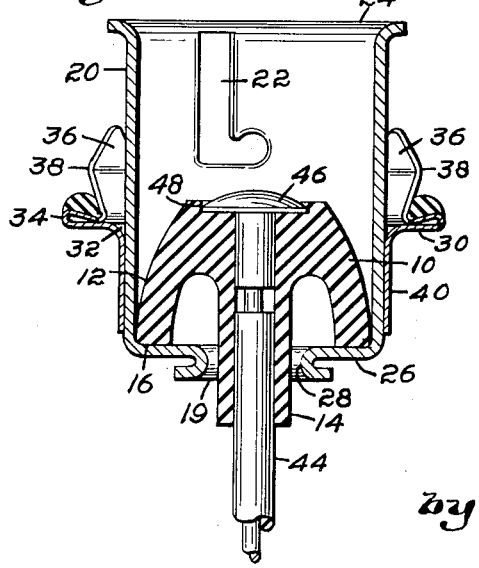
FIG. 4 is a section taken on line 3—3 of FIG. 3, the wire lead being shown in side elevation.
Figure 5:
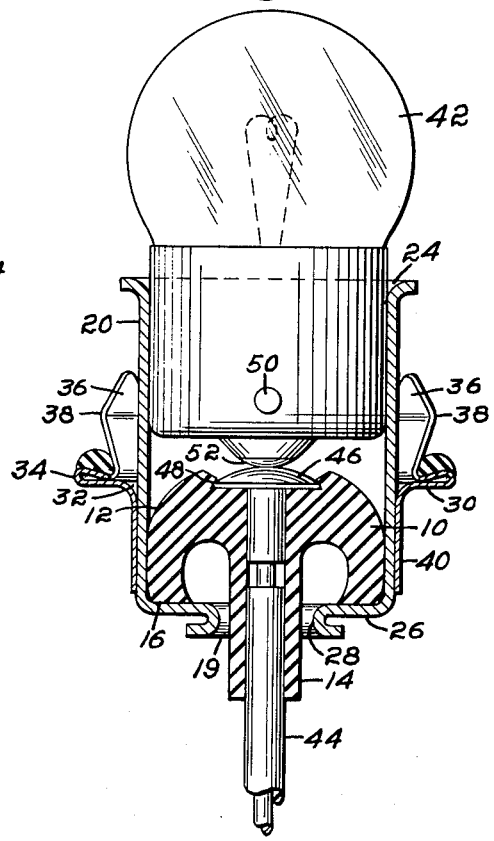
FIG. 5 is similar to FIG. 4 showing the receptacle and spring seal engaged with an electric bulb, the bulb being shown in side elevation.

The seal spring is seated in the tubular body portion 20 when the terminal edge 16 of the flange 12 rests in superposed abutting relationship on the flanged base portion 26 and the stem 14 extends through the aperture formed by the inner wall 28. The terminal end of the stem 14 extends beyond the external surface of the flanged base portion 26. A wire lead 44 having an insulated cover is engaged with the seal means by passing it into the wire receiving passage 18 until it extends above the seal means on one side and beyond the stem means on the other. A flanged cap 46 is clamped on to the bare wire of the wire lead so that the cap flange extends beyond the diameter of the wire lead 44. The flange of the cap also has a diameter greater than the diameter of the wire receiving passage 18. The wire is then drawn down through the passage 18 in the direction of the stem 14 until the undersurface of the flange of the cap 46 is in superposed abutting relationship to the upper part of the seal spring as shown in FIG. 4. In order to assist in the engagement of the flanged portion of the cap 46 with the base portion 10 of the seal spring a well 48 may be formed in the upper surface of the base portion 10 having a depth equal to the thickness of the flange of the cap 46. As illustrated in FIG. 4 the well has a depth which is slightly less than the thickness of the flange of the cap 46 so that a portion of the cap 46 protrudes above the surface of the seal spring. A bulb 42 is now passed into the acceptance end 24 of the socket and the studs 50 of the bulb are engaged with the J-slots 22 in the usual manner. The J-slots 22 and the upper surface of the seal spring with its associated wire lead 44 and cap 46 are fixed in such a way that the electrical contact 52 of the bulb is forced against the upper portion of the cap 46 which in turn forces the flange 12 into a bowed configuration and at the same time presses the outer surface of the flange 12 into intimate abutting contact with the inner surface of the tubular body portion 20. At the same time the stem 14 is flexed downward to pass deeper through the inner wall 28. Although it is not necessary to form a well 48 as described hereinbefore, the utilization of the well 48 allows a better engagement between the cap 46 and the base portion 10 of the seal means.

I claim:

An electrical bulb socket comprising a receptacle having a base portion, a shell in integral right angle relationship with said base portion and extending away from said base portion, said base portion having an aperture therethrough, and a flexible unitary seal spring in said receptacle, said seal spring comprising a base part, a flange having the form of a truncated cone, having a terminal edge and extending from the periphery of said base part in integral relationship therewith and a stem extending from said base part through said aperture, said flange circumscribing said stem in spaced relation thereto and said terminal edge of said flange in abutting superimposed relation with said base portion and said stem having a channel extending axially therethrough and said base part having a well formed therein adapted to receive the flanged cap of a lead.

References Cited in the file of this patent

UNITED STATES PATENTS

| | | |
|---|---|---|
| 2,195,189 | Sauer | Mar. 26, 1940 |
| 2,664,548 | Hall | Dec. 29, 1953 |
| 2,704,355 | Holton | Mar. 15, 1955 |
| 2,705,308 | Howard | Mar. 29, 1955 |
| 2,719,956 | Leighton | Oct. 4, 1955 |
| 2,941,182 | Heller | June 14, 1960 |

FOREIGN PATENTS

| | | |
|---|---|---|
| 233,295 | Australia | Oct. 29, 1959 |